Dec. 31, 1963  A. F. ERICKSON  3,115,952
VEHICLE DISK BRAKE
Filed Oct. 26, 1960  3 Sheets-Sheet 1

INVENTOR
ANTON F. ERICKSON
BY
HIS ATTORNEY

INVENTOR.
ANTON F. ERICKSON
BY
HIS ATTORNEY

INVENTOR.
ANTON F. ERICKSON
BY
HIS ATTORNEY

United States Patent Office 3,115,952
Patented Dec. 31, 1963

3,115,952
VEHICLE DISK BRAKE
Anton F. Erickson, Dayton, Ohio, assignor to General Motors Corporation, Detroit, Mich., a corporation of Delaware
Filed Oct. 26, 1960, Ser. No. 65,070
4 Claims. (Cl. 188—18)

This invention relates to a vehicle brake and more particularly to a vehicle disk brake.

It is an object of this invention to provide a vehicle disk brake with a wheel cylinder which is mounted concentric with a rotating brake disk.

It is another object of this invention to provide a vehicle disk brake having a wheel cylinder concentrically mounted within the stationary support member for the braking means.

It is a further object of this invention to provide a wheel cylinder which creates an actuating force which is counteracted by a back force from the wheel bearing for the vehicle wheel.

The objects of this invention are accomplished by constructing a brake disk which is mounted on the wheel hub for rotation with the vehicle wheel. The brake shoe engages a planar surface on a brake disk and is engaged by an actuating force created by a wheel cylinder mounted concentrically with the brake supporting member. In this manner, the brake actuating thrust creates a force which is counteracted by a back force from the bearing for the vehicle wheel. This provides a relatively simple and rugged braking means for a vehicle wheel.

Further objects and advantages of the present invention will be apparent from the drawings wherein preferred embodiments of the present invention are clearly shown.

Figure 1:
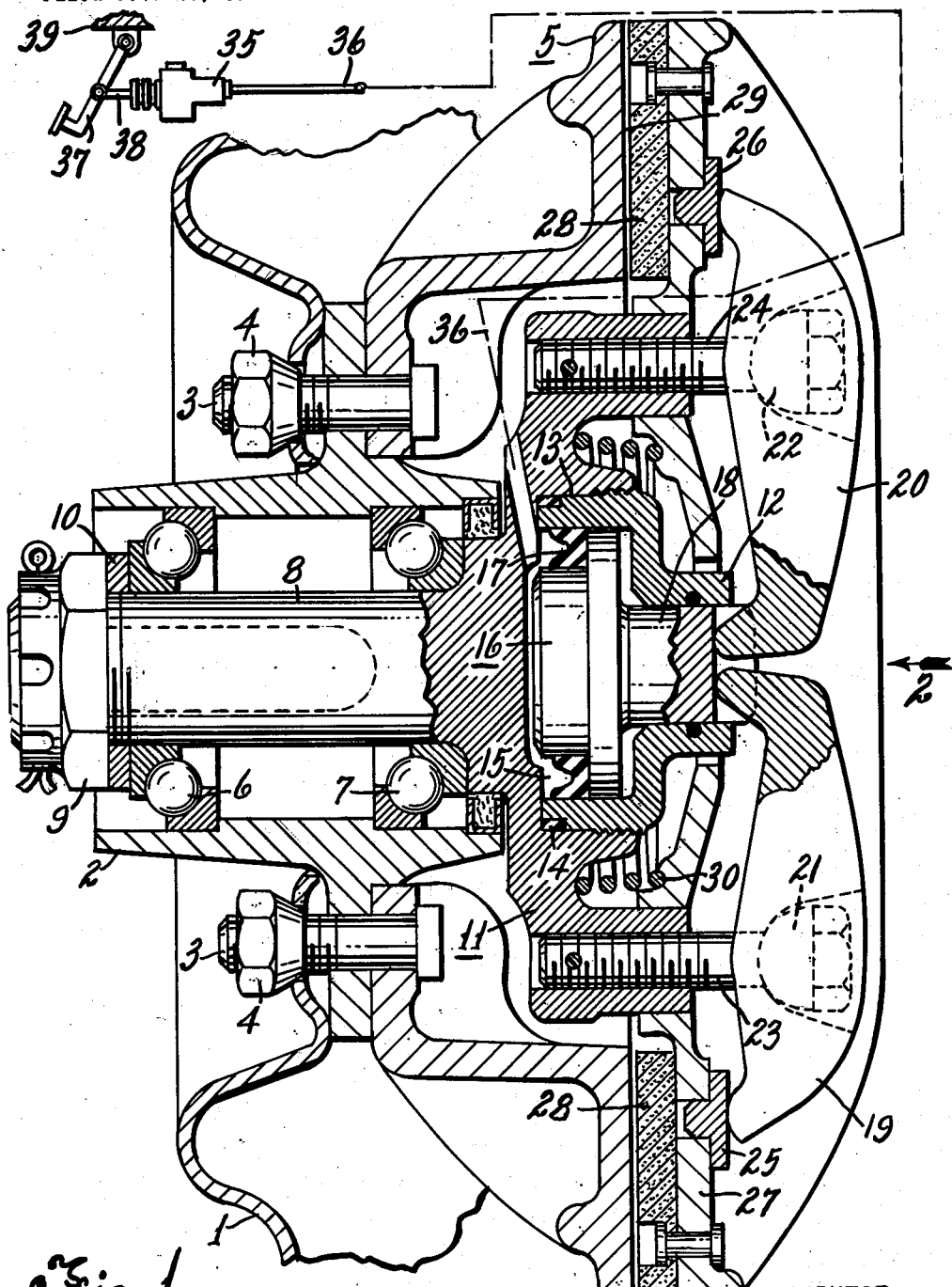
FIGURE 1 is a cross section view of a vehicle disk brake.

Referring to FIGURE 1 the vehicle wheel is fastened to the hub 2 by a plurality of bolts 3 and nuts 4. The brake disk 5 is also fastened to the hub 2 by the plurality of bolts 3 and nuts 4. The hub 2 is rotatably mounted on the bearing assemblies 6 and 7 which are retained on the outer periphery of the spindle 8 by a nut 9 and a washer 10.

The spindle 8 is formed on a steering knuckle 11 which has means for fastening to the steering mechanism for supporting of the steering knuckle. The fastening means for the steering knuckle 11 are not shown. The steering knuckle 11 forms a means for concentrically mounting the wheel cylinder 12. The wheel cylinder 12 threadedly engages a central opening 13 in the steering knuckle 11. The seal 14 seals the actuating chamber 15 for actuation of the brakes. The piston 16 is provided with a seal 17. Piston 16 forms a push rod 18 for actuation of the brakes.

As the piston 16 moves axially it pivotally operates the levers 19 and 20 respectively. The levers 19 and 20 pivot about fulcrum points formed by the buttons 21 and 22 retained on the bolts 23 and 24. The bolts 23 and 24 threadedly engage the steering knuckle 11 to provide means for adjusting a clearance between the brake shoe and the brake disk.

The levers 19 and 20 are pivotally mounted on the hardened inserts 25 and 26 on the brake shoe 27. The brake shoe 27 is lined with segments of a friction material 28 which are riveted or otherwise suitably secured to it. The lining segments 28 frictionally engage the lateral surface 29 of the brake disk 5. The brake shoe 27 is retracted by the spring 30 which is concentrically located around the wheel cylinder 12.

Figure 2:
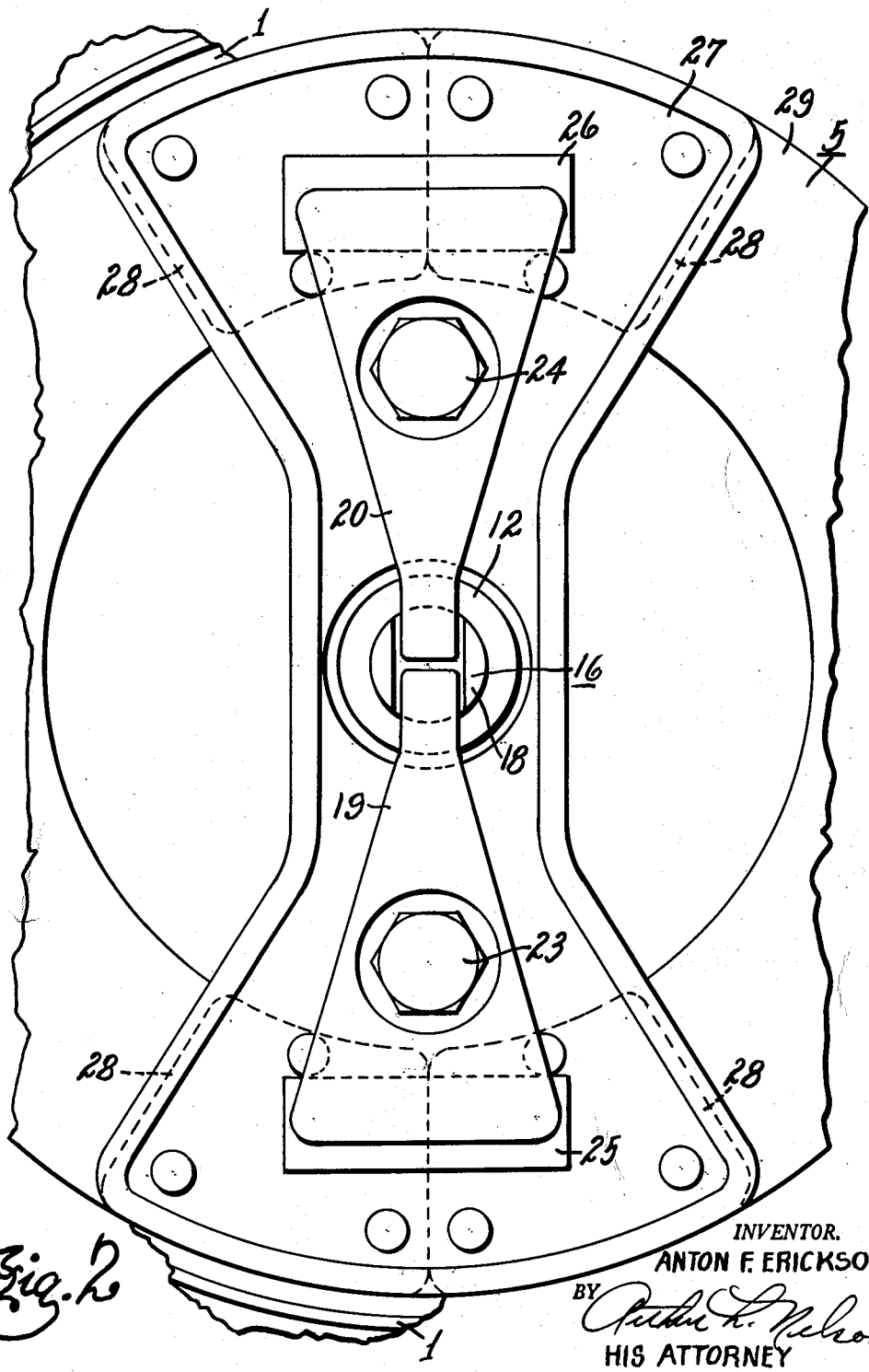
FIGURE 2 is an end view of the vehicle brake as shown in FIGURE 1 taken from the direction of the arrow 2 in FIGURE 1.

Referring to FIGURE 2 an end view discloses the disk brake and more clearly shows the relative location of the brake shoe and the shape of the brake levers 19 and 20.

The hydraulic wheel cylinder 12 and the piston 16 form a fluid actuating chamber 15. The fluid actuating chamber 15 is connected to a master cylinder 35 by the conduit means 36. Fluid is pressurized in the master cylinder 35 by means of a brake pedal 37 and push rod 38, the brake pedal 37 being pivotally mounted on the chassis 39.

Figure 3:
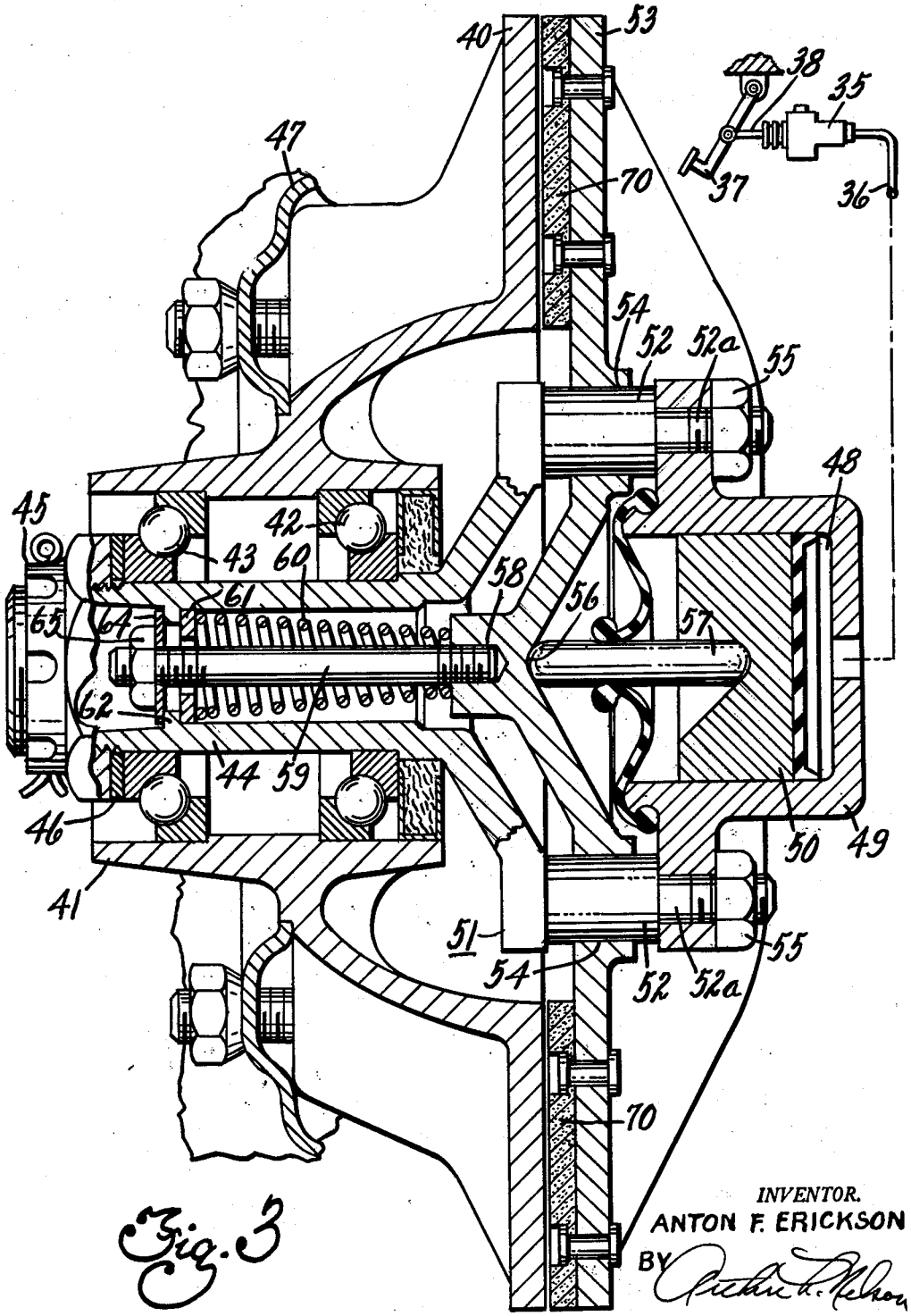
FIGURE 3 is a cross section view of a vehicle disk brake which is a modified version of the brake of FIGURE 1.

FIGURE 3 illustrates a modified version of the vehicle disk brake wherein the pivoting levers for transmitting the actuating means from the wheel cylinder to the brake shoe are eliminated by the use of a push rod 57. A brake disk 40 forms a part of the wheel hub 41 which is rotatably mounted on the bearing assemblies 42 and 43. The bearing assemblies are fastened to the outer periphery of the spindle 44 by the nut 45 and washer 46. The wheel 47 is bolted to a radial flange on the hub 41.

The vehicle brakes are actuated by a master cylinder having conduit means in communication with a fluid actuating chamber 48 of each wheel assembly. This chamber is formed by the hydraulic wheel cylinder 49 and the piston 50. The spindle 44 is formed as a part of the steering knuckle 51. The steering knuckle 51 also has the bosses 52 formed thereon which receive the brake shoe 53 and permit relative axial movement of the brake shoe 53 relative to the rotating brake disk 40.

The brake shoe 53 has openings 54 for the reception of the bosses 52. The stub bolts 52a are fastened in the bosses 52 and fasten the wheel cylinder 49 by the plurality of nuts 55.

The brake shoe 53 extends through the central portion of the vehicle brake assembly and has a recess 56 for reception of the push rod 57. The push rod 57 transmits the force from the hydraulically actuated piston 50 to the brake shoe 53.

The brake shoe 53 also has a bolt hole 58 into which the adjusting bolt 59 is threaded. The retraction spring 60 is placed concentrically around the adjusting screw 59. The retraction spring is compressably mounted between the brake shoe 53 and the washer 61. A shoulder 62 is formed within the central opening in the spindle 44. The washer 64 and nut 65 form the fastening means and also the adjusting means for the vehicle brakes.

The operation of the vehicle brake illustrated in FIGURES 1 and 2 is described in the following paragraphs. As the fluid is pressurized within the master cylinder 35 the fluid is also pressurized within the actuating chamber 15 of the wheel cylinder 12. This pressurized fluid forces the piston 16 in an axial direction to pivot the levers 19 and 20 on the respective buttons 21 and 22. The pivoting of the levers 19 and 20 distributes an actuating force to the inserts 25 and 26, biasing the brake shoe 27 so that the segments 28 frictionally engage the radial facing 29 of the brake disk 5. The greater the pressurization of the fluid the greater the frictional engagement of the friction segments with the brake disk.

The vehicle brakes are retracted by the releasing of the pressure of the brake pedal 37 and diminishing the pressurization of the fluid in the master cylinder 35. The piston 16 is then retracted within the wheel cylinder 12 due to the biasing force of the retraction spring 30. The retraction spring is compressably mounted between the steering knuckle 11 and the brake shoe 27 and biases the brake shoe in spaced relation to the rotating brake disk 5 to obtain the retracted position for the vehicle brake.

The brake shoe 27 illustrated in FIGURE 1 and FIGURE 2 may be adjusted by the loosening or tightening of the bolts 23 and 24. A tightening of the bolts reduces the clearance between the brake disk 5 and the brake shoe 27.

The modification illustrated in FIGURE 3 operates in much the same manner as the brake illustrated in FIGURES 1 and 2. The brakes are actuated by pressurizing fluid within the actuating chamber 48 of the wheel cylinder 49. Pressurization within the actuating chamber 48 biases the hydraulic wheel piston 50 axially which in turn creates a thrust on the push rod 57 engaging the brake shoe 53. The resulting axial movement of the brake shoe 53 causes frictional engagement of the brake shoe frictional material 70 with the rotating brake disk 40. As the vehicle brakes are released the retraction spring 60 biases the brake shoe 53 in spaced relation to the rotating brake disk 40.

The brake may be adjusted by the nut 65 on the bolt 59. The bolt 59 is a stud bolt threaded into the central portion of the brake shoe 53 a decrease in the clearance between the brake shoe 53 and the brake disk 40 is obtained when the nut 65 is tightened on the stud bolt 59. In this manner the brakes may be adjusted to allow for the wear on the segments of frictional material 70.

While the embodiments of the present invention as herein disclosed, constitutes preferred forms, it is to be understood that other forms might be adopted.

What is claimed is as follows:
1. In a vehicle brake, the combination of a wheel, a wheel brake for said wheel including a brake disk and a brake shoe engageable in a plane, a support member having a spindle thereon rotatably supporting said wheel and said brake disk, said support member having a radially extending enlarged section adjacent said spindle and positioned concentrically inward of said brake disk and a central cylinder formed to extend axially thereof and circumferentially spaced means radially intermediate said cylinder and said brake disk, said circumferentially spaced means having said brake shoe mounted thereon in axially movable relation to engage and disengage said brake disk, a hydraulically actuated brake piston reciprocably received in said cylinder, means interconnecting said piston and said brake shoe to engage said brake shoe with said brake disk upon actuation of said brake piston, disengaging means acting between and on said support member and said brake shoe and urging said brake shoe toward disengaged relationship with said brake disk, and means for pressurizing fluid in said cylinder to actuate said brake piston.

2. The combination of claim 1, said brake piston and said cylinder and said circumferentially spaced brake shoe supporting means each having portions thereof positioned radially inward of and being in the plane of engagement of said brake disk and said brake shoe.

3. The combination of claim 1, said brake piston-brake shoe interconnecting means and said brake shoe being positioned substantially on one side of the plane of engagement of said brake shoe with said brake disk and said support member being positioned substantially on the opposite side of that plane.

4. The vehicle brake of claim 1, further comprising means extending outwardly centrally through said wheel support member and engaging said brake shoe and said support member in adjustable relation for adjusting the maximum clearance between said brake disk and said brake shoe by limiting the amount of disengagement obtainable through use of said disengaging means.

References Cited in the file of this patent
UNITED STATES PATENTS

| | | |
|---|---|---|
| 799,691 | Sturtevant et al. | Sept. 19, 1905 |
| 1,927,358 | Breguet | Sept. 19, 1933 |
| 2,115,083 | Pierce | Apr. 26, 1938 |
| 2,523,598 | Smith | Sept. 26, 1950 |
| 2,659,458 | Mercier | Nov. 17, 1953 |